United States Patent [19]

Ezaki

[11] Patent Number: 5,512,641
[45] Date of Patent: Apr. 30, 1996

[54] AROMATIC POLYIMINE AND PROCESS FOR PREPARING THE SAME, AND AROMATIC OLIGOIMINE USED FOR AROMATIC POLYIMINE AND PROCESS FOR PREPARING THE SAME

[75] Inventor: Yoichiro Ezaki, Tsukuba, Japan

[73] Assignee: Arakawa Kagaku Kogyo Kabushiki Kaisha, Osaka, Japan

[21] Appl. No.: 403,773

[22] Filed: Mar. 24, 1995

[30] Foreign Application Priority Data

Jul. 27, 1993 [JP] Japan .................................. 5-185046

[51] Int. Cl.$^6$ .................................................. C08G 12/08
[52] U.S. Cl. ..................... 525/504; 528/137; 528/142; 528/146; 528/149; 528/153; 528/158; 528/162
[58] Field of Search ..................... 528/137, 142, 528/146, 149, 153, 158, 162; 525/504

[56] References Cited

U.S. PATENT DOCUMENTS

| | | | |
|---|---|---|---|
| 3,023,161 | 2/1962 | Luvisi et al. | 528/162 |
| 3,516,971 | 6/1970 | Webb | 528/162 |
| 3,526,611 | 9/1970 | Webb | 528/162 |
| 5,378,795 | 1/1995 | Bryant | 528/244 |

FOREIGN PATENT DOCUMENTS

| | | |
|---|---|---|
| 52-124097 | 10/1977 | Japan . |
| 63-210119 | 8/1988 | Japan . |
| 1298678 | 12/1972 | United Kingdom . |

OTHER PUBLICATIONS

Chemical Abstracts 118:234029, "Macrocyclic and Macroacyclic Compartmental Schiff Bases".
Defensive Publication, US-T-918 005, Baker et al., published Jan. 1, 1974.
International Search Report for International Application No. PCT/JP94/01224.

*Primary Examiner*—Frederick Krass
*Attorney, Agent, or Firm*—Varndell Legal Group

[57] ABSTRACT

What is disclosed an aromatic oligoimine having a recurring unit composed of an aromatic dialdehyde having a phenolic hydroxyl group and an aromatic diamine and a number-average degree of polymerization of 2 to 20 and a process for preparing the same, and an aromatic polyimine made by thermally dehydrating the aromatic oligoimine and a process for preparing the same.

10 Claims, No Drawings

AROMATIC POLYIMINE AND PROCESS FOR PREPARING THE SAME, AND AROMATIC OLIGOIMINE USED FOR AROMATIC POLYIMINE AND PROCESS FOR PREPARING THE SAME

TECHNICAL FIELD

The present invention relates to an aromatic polyimine and a process for preparing the same, and an aromatic oligoimine used for the aromatic polyimine and a process for preparing the same, and more particularly to an aromatic oligoimine which can be suitably used for materials such as a matrix resin for composite materials, an insulating material and a heat-resistant adhesive and a process for preparing the same, and an aromatic polyimine made of the aromatic oligoimine, which is excellent in heat resistance, film-forming property and fiber-forming property and can be suitably used for various polymeric materials for industry and a process for preparing the same.

BACKGROUND ART

It has been expected that an aromatic polyimine is used as a heat-resistant material. As a process for preparing the aromatic polyimine, for instance, a method comprising subjecting an aromatic dialdehyde and an aromatic diamine to condensation has been studied. However, because an oligomer which is a resultant intermediate product during the condensation does not dissolve in most of solvents and the melting point of the oligomer is extremely high, it is difficult to polymerize the oligomer to have a higher molecular weight. It is reported that a polyimine having a high molecular weight can be obtained by selecting a phenolic solvent as a reaction solvent (Colloid and Polymer Science, vol. 261, p. 493 (1983)).

However, there is a great limitation with regard to productivity on an industrial scale because there are some disadvantages such that the phenolic solvent has high toxicity and pungency and that it is dangerous to handle the phenolic solvent, moreover because art industrial synthetic method of the aromatic dialdehyde has not yet been completed.

Also, there is proposed a process for preparing a polyimine having a high molecular weight comprising introducing a functional group into an aromatic dialdehyde or an aromatic diamine which is a raw material of the polyimine and increasing the solubility of a resulting oligomer, which is an intermediate product, in a solvent. For instance, as a polyimine having a phenolic hydroxyl group, there is known a condensation product of 5,5'-methylenebissalicylaldehyde and 1,2-diaminobenzene (Journal of Panerican Chemical Society, vol. 79, p. 6000 (1957)). However, because the solubility of an intermediate oligomer, which is generated during the condensation reaction, in the used solvent is not sufficiently increased, there is a disadvantage that the oligomer is easily extracted and precipitated at the time the molecular weight is reached about 10000, so that a product having a high molecular weight cannot be obtained. Therefore, the polyimine cannot be absolutely used as a polymeric material for industry.

Moreover, as a polyimine having a phenolic hydroxyl group, there is known a polyimine made by carrying out the condensation of glyoxal and 2,4-diaminophenol, and a polyimine having a high molecular weight is obtained (Macromolecule Chemie, vol. 56, p. 195 (1962)). However, because glyoxal which is an aliphatic dialdehyde is used as a dialdehyde component, the polyimine is wrong in heat resistance and cannot be used as a material for industry.

Thus, conventional polyimines containing a phenolic hydroxyl group are not satisfactory in terms of difficulty of their synthesis and heat resistance, and nowadays, it is earnestly desired that a polyimine having a high molecular weight, which is useful as a polymeric material for industry is developed.

In consideration of the above-mentioned actual circumstances, the present inventor has earnestly studied an aromatic polyimine having a phenolic hydroxyl group, which can be used as a heat-resistant polymeric material for industry and a process for preparing the same. As a result, the present inventor has found out that an aromatic polyimine made of an aromatic oligoimine composed of specific constituents can thoroughly solve the above-mentioned problems. The present invention has been accomplished based on the above knowledge.

DISCLOSURE ON INVENTION

The present invention relates to

① an aromatic oligoimine composed of an aromatic dialdehyde having a phenolic hydroxyl group, represented by the general formula (I):

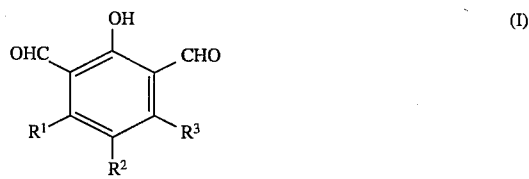

wherein each of $R^1$, $R^2$ and $R^3$ is independently hydrogen atom, an alkyl group or an aryl group, the total number of carbon atoms contained in $R^1$, $R^2$ and $R^3$ is at most 10, and an aromatic diamine represented by the general formula (II):

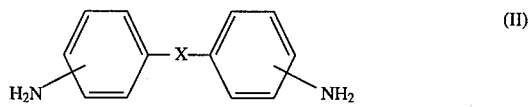

wherein X is a single bond, a linear or branched alkylene group having at most 6 carbon atoms, an arylene group, oxygen atom, sulphur atom, $-SO_2-$, a group represented by the general formula: $-Y^1-Ar-Y^1-$ in which Ar is phenylene group, $Y^1$ is a single bond, a linear or branched alkylene group having at most 6 carbon atoms, an arylene group, oxygen atom, sulphur atom or $-SO_2-$, or a group represented by the general formula: $-Y^1-Ar-Y^1-Ar-Y^1-$ in which Ar and $Y^1$ are the same as defined above, having a recurring unit represented by the general formula (III):

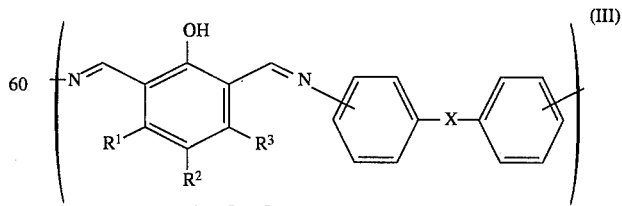

wherein $R^1$, $R^2$, $R^3$ and X are the same as defined above and a number-average degree of polymerization of 2 to 20, ② a process for preparing an aromatic oligoimine having a recurring unit represented by the general formula (III):

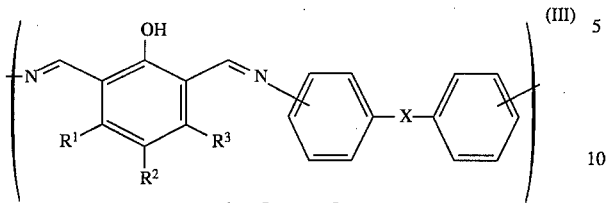

wherein each of $R^1$, $R^2$ and $R^3$ is independently hydrogen atom, an alkyl group or an aryl group, the total number of carbon atoms contained in $R^1$, $R^2$ and $R^3$ is at most 10, and X is a single bond, a linear or branched alkylene group having at most 6 carbon atoms, an arylene group, oxygen atom, sulphur atom, —SO$_2$—, a group represented by the general formula: —$Y^1$—Ar—$Y^1$— in which Ar is phenylene group, $Y^1$ is a single bond, a linear or branched alkylene group having at most 6 carbon atoms, an arylene group, oxygen atom, sulphur atom or —SO$_2$—, or a group represented by the general formula: —$Y^1$—Ar—$Y^1$—Ar—$Y^1$— in which Ar and $Y^1$ are the same as defined above, and a number-average degree of polymerization of 2 to 20, characterized by conducting the condensation of an aromatic dialdehyde having a phenolic hydroxyl group, represented by the general formula (I):

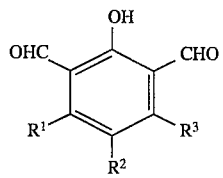

wherein $R^1$, $R^2$ and $R^3$ are the same as defined above and an aromatic diamine represented by the general formula (II):

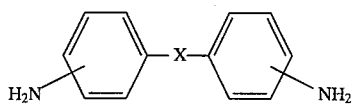

wherein X is the same as defined above in the presence of at least one solvent selected from an amido solvent and a phenolic solvent, ③ an aromatic polyimine having a recurring unit represented by the general formula (III):

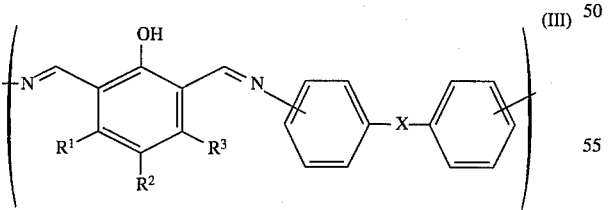

wherein each of $R^1$, $R^2$ and $R^3$ is independently hydrogen atom, an alkyl group or an aryl group, the total number of carbon atoms contained in $R^1$, $R^2$ and $R^3$ is at most 10, and X is a single bond, a linear or branched alkylene group having at most 6 carbon atoms, an arylene group, oxygen atom, sulphur atom, —SO$_2$—, a group represented by the general formula: —$Y^1$—Ar—$Y^1$— in which Ar is phenylene group, $Y^1$ is a single bond, a linear or branched alkylene group having at most 6 carbon atoms, an arylene group, oxygen atom, sulphur atom or —SO$_2$—, or a group represented by the general formula: —$Y^1$—Ar—$Y^1$—Ar—$Y^1$— in which Ar and $Y^1$ are the same as defined above, composed of an aromatic dialdehyde having a phenolic hydroxyl group, represented by the general formula (I):

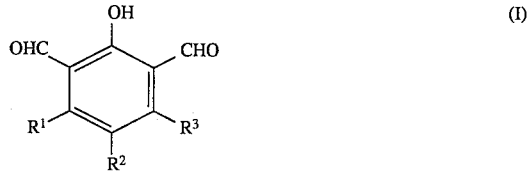

wherein $R^1$, $R^2$ and $R^3$ are the same as defined above and an aromatic diamine represented by the general formula (II):

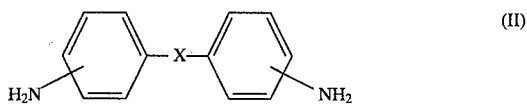

wherein X is the same as defined above, and made by thermally dehydrating an aromatic oligoimine having a recurring unit represented by the general formula (III):

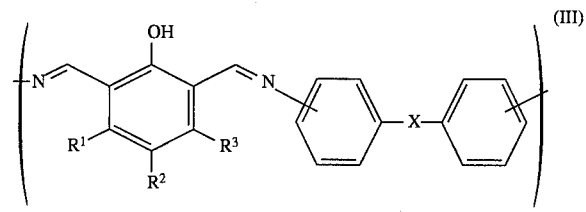

wherein $R^1$, $R^2$, $R^3$ and X are the same as defined above and a number-average degree of polymerization of 2 to 20, and ④ a process for preparing an aromatic polyimine having a recurring unit represented by the general formula (III):

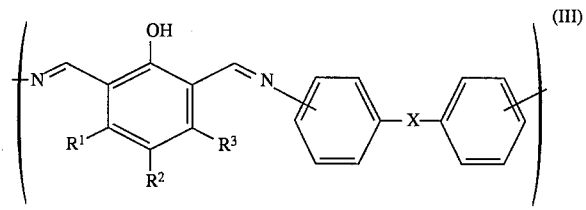

wherein each of $R^1$, $R^2$ and $R^3$ is independently hydrogen atom, an alkyl group or an aryl group, the total number of carbon atoms contained in $R^1$, $R^2$ and $R^3$ is at most 10, and X is a single bond, a linear or branched alkylene group having at most 6 carbon atoms, an arylene group, oxygen atom, sulphur atom, —SO$_2$—, a group represented by the general formula: —$Y^1$—Ar— $Y^1$— in which Ar is phenylene group, $Y^1$ is a single bond, a linear or branched alkylene group having at most 6 carbon atoms, an arylene group, oxygen atom, sulphur atom or —SO$_2$—, or a group represented by the general formula: —$Y^1$—Ar—$Y^1$—Ar—$Y^1$— in which Ar and $Y^1$ are the same as defined above composed of an aromatic dialdehyde having a phenolic hydroxyl group, represented by the general formula (I):

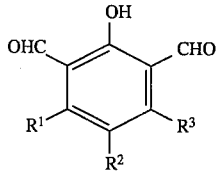

wherein $R^1$, $R^2$ and $R^3$ are the same as defined above and an aromatic diamine represented by the general formula (II):

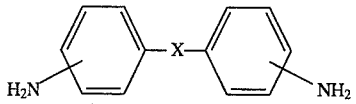

wherein X is the same as defined above, characterized by thermally dehydrating an aromatic oligoimine having a recurring unit represented by the general formula (III):

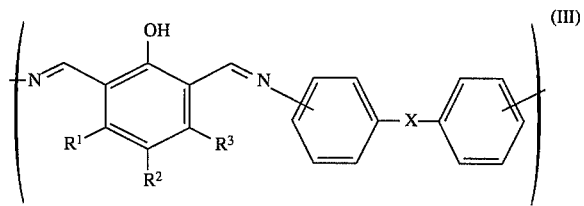

wherein $R^1$, $R^2$, $R^3$ and X are the same as defined above and a number-average degree of polymerization of 2 to 20.

BEST MODE FOR CARRYING OUT THE INVENTION

An aromatic dialdehyde component used in the present invention is an aromatic dialdehyde having a phenolic hydroxyl group, represented by the general formula (I):

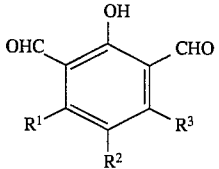

wherein each of $R^1$, $R^2$ and $R^3$ is independently hydrogen atom, an alkyl group or an aryl group, the total number of carbon atoms contained in $R^1$, $R^2$ and $R^3$ is at most 10.

Among the above-mentioned aromatic dialdehydes, in consideration of ease of obtaining a raw material and its cost, aromatic dialdehydes whose total number of carbon atoms contained in $R^1$, $R^2$ and $R^3$ of the general formula (I) is about 1 to about 4 are suitable.

As typical examples of the above-mentioned aromatic dialdehyde, there can be cited, for instance, 2,6-diformylphennol, 2,6diformyl-4-methylphenol, 2,6-diformyl-4-ethylphenol, 2,6-diformyl-4-t-butylphenol, 2,6-diformyl-4-octylphenol, 2,6-diformyl-4-phenylphenol, 2,6-diformyl-3,4-dimethylphenol, 2,6-diformyl-3,4,5-trimethylphenol and the like. All of these aromatic dialdehydes can be easily obtained by oxidation of their corresponding dialcohols.

An aromatic diamine component used in the present invention is an aromatic diamine represented by the general formula (II):

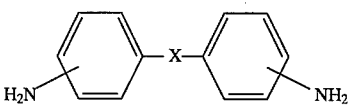

wherein X is a single bond, a linear or branched alkylene group having at most 6 carbon atoms, an arylene group, oxygen atom, sulphur atom, —$SO_2$—, a group represented by the general formula: —$Y^1$—Ar—$Y^1$— in which Ar is phenylene group, $Y^1$ is a single bond, a linear or branched alkylene group having at most 6 carbon atoms, an arylene group, oxygen atom, sulphur atom or —$SO_2$—, or a group represented by the general formula: —$Y^1$—Ar—$Y^1$—Ar—$Y^1$— in which Ar and $Y^1$ are the same as defined above.

When X in the above-mentioned general formula (II) or $Y^1$ in the general formula which represents one exemplified group of the X is an alkylene group or an arylene group, in consideration of solubility of an obtained aromatic oligoimine and heat resistance of an obtained aromatic polyimine, it is desired that the number of carbon atoms contained in the alkylene group is 1 to 4, and it is desired that the arylene group is phenylene group.

As typical examples of the above-mentioned aromatic diamine, there can be cited, for instance, aromatic diamines having 2 benzene rings such as benzidine, 3,3'-diaminobiphenyl, 3,4'-diaminobiphenyl, 4,4'-diaminobiphenyl, 4,4'-diaminodiphenyl ether, 3,3'-diaminodiphenyl ether, 3,4'-diaminodiphenyl ether, 4,4'-diaminodiphenyl sulfide, 3,3'-diaminodiphenyl sulfide, 3,4'-diaminodiphenyl sulfide, 4,4'-diaminodiphenyl sulfone, 3,3'-diaminodiphenyl sulfone, 3,4'-diaminodiphenyl sulfone, 4,4'-diaminodiphenylmethane, 3,3'-diaminodiphenylmethane, 3,4'-diaminodiphenylmethane, 2,2-bis(4-aminophenyl)propane and bis(4-aminophenyl)methane; aromatic diamines having 3 benzene rings such as 1,4-bis(4-aminophenoxy)benzene, 1,3-bis(4-aminophenoxy)benzene, 1,4-bis(3-aminophenoxy)benzene, 1,4-bis(4-aminophenyl) benzene, 1,3-bis(4-aminophenyl)benzene, 1,4-bis(3-aminophenyl)benzene, α,α'-bis(4-aminomethyl)-1,4-diisopropylbenzene and α,α'-bis(3-aminomethyl)-1,4-diisopropylbenzene; aromatic diamines having 4 benzene rings such as 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(3-aminophenoxy)phenyl]propane, bis[4-(4-aminophenoxy)phenyl]methane, bis[4-(3-aminophenoxy)phenyl]methane, bis[4-(4-aminophenoxy)phenyl]ether, bis[4-(3-aminophenoxy)phenyl]ether, bis[4-(4-aminophenoxy)phenyl]sulfone and bis[4-(3-aminophenoxy)phenyl]sulfone; and the like.

Among the above-mentioned aromatic diamines, in consideration of ease of obtaining the aromatic diamine, ease of synthesis of an aromatic oligoimine and solubility of the obtained aromatic oligoimine, there are desired 4,4'-diaminodiphenyl ether, 4,4'-diaminodiphenylmethane, 1,3-bis(4-aminophenoxy)benzene, 1,4-bis(4-aminophenoxy)benzene, 3,3'-diaminodiphenyl sulfone, 2,2-bis(4-aminophenyl)propane and 4,4'-bis(4-aminophenoxy)biphenyl.

Next, an aromatic oligoimine and a process for preparing the same of the present invention are concretely explained.

The above-mentioned aromatic dialdehyde represented by the general formula (I) and the aromatic diamine represented by the general formula (II) are subjected to a condensation reaction in the presence of a solvent.

As the above-mentioned solvent, there can be cited, for instance, amido solvents such as dimethylformamide, dimethylacetamide, N-methylpyrrolidone and hexamethylphosphotriamide; and phenolic solvents such as phenol, orthocresol, metacresol, paracresol and resorcinol. These solvents can be used alone or in an admixture of at least 2 kinds of these. Moreover, in consideration of odor, toxicity and pungency of the solvent, among the above-mentioned solvents, the amido solvent is especially preferable.

It is desired that the molar ratio of the above-mentioned aromatic dialdehyde to the aromatic diamine (aromatic dialdehyde/aromatic diamine) is at least 0.8, preferable at least 0.95, and at most 1.2, preferable at most 1.05. When the molar ratio is too small and the molar ratio is too large, as mentioned below, there is a tendency that obtaining a desired product having a high molecular weight becomes difficult even though a step of thermal drying is employed. Moreover, from the viewpoint that the reaction of the aromatic dialdehyde with the aromatic diamine is a condensation reaction, it is especially preferable that the molar ratio is 1.

The reaction temperature during the reaction of the above-mentioned aromatic dialdehyde and the aromatic diamine is not particularly limited, and it is desired that the reaction temperature is about 10° to about 150° C. The reaction can be usually carried out at room temperature. Also, the reaction period of time is not particularly limited if the reaction solution can be uniform. It is usually desired that the reaction period of time is about 10 minutes to about 12 hours.

The concentration of the reaction solution during the reaction of the aromatic dialdehyde and the aromatic diamine in the presence of the above-mentioned solvent cannot be absolutely determined because the concentration varies depending upon, for instance, the kinds of used aromatic diamine and the like. When the total amount of the aromatic dialdehyde and the aromatic diamine is too large, there is a tendency that the aromatic oligoimine is precipitated before the aromatic oligoimine is thermally dehydrated to generate the following aromatic polyimine. Therefore, it is preferable that the total amount is at most 50% by weight of all of the solution, and it is more preferable that the total amount is 10 to 40% by weight of all of the solution.

Thus the obtained solution of the aromatic oligoimine is stable in the sealed state at room temperature for at least 6 months, and the generation of precipitation and its gelation are not observed.

The infrared absorption spectrum (hereinafter referred to as IR) of the product which is obtained by drying the solution of the above-mentioned aromatic oligoimine at room temperature to remove a solvent from the solution indicates a characteristic absorption at 3345 cm$^{-1}$ (N—H originated from amine), 1680 cm$^{-1}$ (C=O originated from aldehyde) and 1600 cm$^{-1}$ (C=N originated from imine). Also, the viscosity (kinetic viscosity) of the solution of the aromatic oligoimine is about 5 to about 500 cSt at 30° C. In consideration of ease of handling the solution of the oligomer, it is preferable that the viscosity of the solution is about 7 to about 400 cSt.

Also, by measuring a nuclear magnetic resonance spectrum (hereinafter referred to as $^1$H-NMR) of the solution of the aromatic oligoimine which is obtained by controlling the molar ratio of the aromatic dialdehyde to the aromatic diamine (aromatic dialdehyde/aromatic diamine) to 1.0, the number-average degree of polymerization of the aromatic oligoimine can be calculated. That is, the signal of proton of a terminal aldehyde can be observed near 10.5 ppm, and the signal of proton of an imine can be observed near 9.0 ppm. From these integrated values, the number-average degree of polymerization of the aromatic oligoimine can be determined in accordance with the following equation.

[Number-average degree of polymerization]= ½×[(Integrated value of signal of H of imine/Integrated value of signal of H of terminal aldehyde)+1]

The number-average degree of polymerization of the aromatic oligoimine, which is calculated as mentioned above varies according to the kinds of used aromatic diamine. The number-average degree of polymerization is usually 2 to 20. Moreover, in consideration of solubility and stability of the solution of the oligomer, it is preferable that the number-average degree of polymerization of the aromatic oligoimine is 3 to 15.

Thus, the aromatic oligoimine of the present invention has a recurring unit represented by the general formula (III):

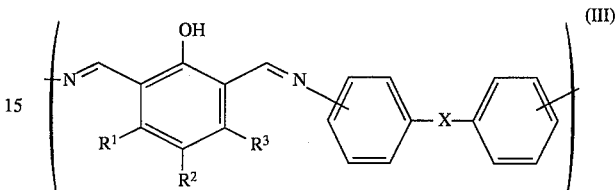

wherein $R^1$, $R^2$, $R^3$ and X are the same as defined above and a number-average degree of polymerization of 2 to 20.

Next, an aromatic polyimine and a process for preparing the same of the present invention are concretely explained.

The solid matter of the reaction product contained in the reaction solution (solution of the aromatic oligoimine) is, of course, the aromatic oligoimine. Therefore, in order to give a polymer (aromatic polyimine) from the reaction solution, it is necessary that the reaction solution is thermally dehydrated and subjected to a further thermal condensation under a prescribed condition. However, because the melting point of the obtained polymer is extremely high, it is preferable that the solution of the aromatic oligoimine is usually formed into a film or a fiber and subjected to a thermal condensation.

For instance, when a film of the aromatic polyimine is obtained, the obtained solution of the aromatic oligoimine can be casted on a suitable plate and thermally dried. Moreover, when the thermally drying temperature during thermal drying is too low, there is a tendency that it takes an extremely long period of time to give an aromatic polyimine having a high molecular weight. Therefore, it is usually desired that the temperature is at lowest 80° C., preferably at lowest 100° C. Also, when the thermally drying temperature is too high, there is a tendency that thermal decomposition of the aromatic polyimine easily occurs. Therefore, it is generally desired that the temperature is at highest 350° C., preferably at highest 300° C. Also, the thermally drying period of time varies depending upon the thermally drying temperature, and it is suitable that the period of time is usually about 2 minutes to about 12 hours. Also, the thermal drying may be carried out under reduced pressure or carried out plural times by suitably varying the thermally drying temperature and the thermally drying period of time.

Also, as a method for forming the oligomer into a fiber, for instance, there are cited a method comprising discharging the above-mentioned solution of the aromatic oligoimine through a nozzle for spinning to give a filament and increasing the molecular weight of the filament while the solvent is evaporated under the condition of the above-mentioned thermally drying temperature, and the like.

The IR of the aromatic polyimine of the present invention, which is obtained in the form of a molding shows the disappearance of the absorptions at 3345 cm$^{-1}$ (N—H originated from amine) and 1680 cm$^{-1}$ (C=O originated from aldehyde), and the appearance of the absorption at 1620 cm$^{-1}$ (CH=N originated from imine). Therefore, it is understood that the aromatic polyimine has been sufficiently polymerized. Also, when the aromatic polyimine can be dissolved in, for instance, a concentrated sulfuric acid-d2 ($D_2SO_4$), the $^1$H-NMR of the obtained solution can be measured. As a result, the signal of proton of an imine (CH=N) is observed near 8.7 ppm.

Thus, the obtained aromatic polyimine of the present invention has a recurring unit represented by the general formula (III):

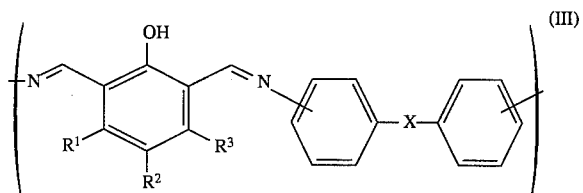

wherein $R^1$, $R^2$, $R^3$ and X are the same as defined above.

Among the aromatic polyimines of the present invention, as to polyimines which can be dissolved in, for instance, a concentrated sulfuric acid, the intrinsic viscosity thereof can be measured. The intrinsic viscosity of the aromatic polyimine (η inh, concentration: 0.2 g/100 cm$^3$) is 0.2 to 4 at 30° C. Moreover, in consideration of dynamic strength such as tensile strength or elongation at break, it is preferable that the intrinsic viscosity of the aromatic polyimine is 0.5 to 4.

Also, among the aromatic polyimines of the present invention, there are some polyimines which cannot be completely dissolved in various organic solvents. As to these polyimines which cannot be completely dissolved in various organic solvents, it is difficult to measure the molecular weight and viscosity thereof.

Accordingly, in this case, in the present invention, the molecular weight of the aromatic polyimine can be indirectly determined by providing its tensile strength and elongation at break as the physical properties which can be replaced with the molecular weight of the aromatic polyimine.

The tensile strength of the aromatic polyimine of the present invention is 100 to 5000 kgf/cm$^2$, and the elongation at break of the aromatic polyimine is 0.5 to 100%. Moreover, in consideration of application to industrial materials and the like, from the viewpoint of the necessity of sufficient mechanical strength, it is preferable that the tensile strength of the aromatic polyimine is 200 to 5000 kgf/cm$^2$ and the elongation at break is 10 to 100%.

Moreover, when the thermally drying temperature exceeds 200° C. during the thermally drying of the above-mentioned solution of the aromatic oligoimine, some of resulting aromatic polyimines become insoluble in the above-mentioned concentrated sulfuric acid depending upon the kinds of used aromatic diamine and the like due to the progress of its cross-linking reaction by heating. However, even in this case, the above-mentioned physical properties are not particularly impaired, and the tensile strength and elongation at break can be provided instead of measuring its intrinsic viscosity. As a result, the same values as mentioned above are obtained, respectively.

The aromatic oligoimine of the present invention can be suitably used for materials such as a matrix resin for composite materials, an insulating material such as insulating varnish and a heat-resistant adhesive. Also, the aromatic polyimine made of the aromatic oligoimine can be usually used as molding products such as a film and a fiber, has transparency and flexibility, and is excellent in tensile strength and heat resistance. Therefore, the aromatic polyimine can be suitably used for polymeric materials for industry such as electronic parts, electrical parts and automobile parts.

Then, the aromatic polyimine and the process for preparing the same, and the aromatic oligoimine used for the aromatic polyimine and the process for preparing the same of the present invention are more specifically explained in accordance with the Examples, and it is to be understood that the present invention is not limited to the Examples.

EXAMPLES 1

A reaction apparatus equipped with a thermometer, a water separator, a nitrogen inlet tube and a stirrer was charged with 1.64 g (0.01 mole) of 2,6-diformyl-4-methylphenol (hereinafter referred to as DFMP), 2.0 g (0.01 mole) of 4,4'-diaminodiphenyl ether (hereinafter referred to as DADPE) and 30 ml of N-methylpyrrolidone (hereinafter referred to as NMP), and the contents were stirred and dissolved with each other. After its dissolution, the reaction was immediately initiated at room temperature, and the reaction solution (total amount of the aromatic dialdehyde and the aromatic diamine (hereinafter referred to as concentration): 10.8% by weight) turned redish orange. The reaction solution was stirred at room temperature for more 2 hours and the reaction was finished to give a reaction solution (solution of the aromatic oligoimine).

The vicosity of the obtained reaction solution and number-average degree of polymerization of the aromatic oligoimine contained in the reaction solution were examined in accordance with the following methods. The results are shown in Table 1.

Next, the above-mentioned reaction solution was casted on a glass plate and allowed to stand at 100° C. for one hour, then at 200° C for 4 hours under reduced pressure (1 Torr) to give a redish orange film having a thickness of 0.028 mm.

Although dissolving the obtained film various organic solvents was tried, the film could not be completely dissolved in the organic solvents, so that the molecular weight of the obtained aromatic polyimine could not be determined.

Accordingly, as the physical properties which can be replaced with the molecular weight, tensile strength and elongation at break were examined in accordance with the following methods. The results are shown in Table 2.

Also, using the obtained film, IR was measured in accordance with a transmission method by means of FTS-7 spectrometer commercially available from Nippon Bio-Rad Laboratories. As a result, the absorption was observed at 1620 cm$^{-1}$. Also, using the film, the glass transition temperature (hereinafter referred to as Tg) and the initiative temperature of thermal decomposition were examined in accordance with the following methods. The results are shown in Table 2.

[Aromatic oligoimine (solution)]
(A) Viscosity

Using an Ubbelohde's viscometer, the viscosity (kinetic viscosity) of the solution of the aromatic oligoimine was measured at 30° C.

(B) Number-average degree of polymerization

Using 0.3 ml of chloroform-d ($CDCl_3$) to which 0.2 ml of the solution of the aromatic oligoimine and a little amount of tetramethylsilane were added, $^1$H-NMR was measured in a double sample tube by means of ARX-300 spectrometer commercially available from BRUKE JAPAN CO. LTD. From the integrated value of the signal of proton of a terminal aldehyde, which was observed near 10.5 ppm and the integrated value of the signal of proton of an imine, which was observed near 9.0 ppm. the number-average degree of polymerization of the aromatic oligoimine was calculated in accordance with the following equation.

[Number-average degree of polymerization]= ½×[(Integrated value of signal of H of imine/Integrated value of signal of H of terminal aldehyde)+1]

[Aromatic polyimine]
(C) Tensile strength and elongation at break

The tensile strength and elongation at break were measured in accordance with the method prescribed in Japanese Industrial Standards (JIS)K-7127. The width of a sample was 10 mm and the length of the sample was 50 mm. The tensile rate was 50 mm/minute.

(D) Tg

Using a System 100 thermalanalyzer commercially available from MAC Science Co., LTD., Tg was measured by elevating a temperature at a rate of 20° C./minute in accordance with differential scanning calorimetric analysis (DSC).

(E) Initiative temperature of thermal decomposition

Using a System 100 thermalanalyzer commercially available from MAC Science Co., LTD., the initiative temperature of thermal decomposition was measured by elevating a temperature at a rate of 20° C./minute in accordance with thermogravimetric analysis (TG).

EXAMPLE 2

A reaction apparatus equipped with a thermometer, a water separator, a nitrogen inlet tube and a stirrer was charged with 16.4 g (0.1 mole) of DFMP, 20.0 g (0.1 mole) of DADPE and 80 ml of NMP, and the contents were stirred and dissolved with each other. After its dissolution, the reaction was immediately initiated at room temperature, and the reaction solution (concentration: 31.3% by weight) turned redish orange. The reaction solution was stirred at room temperature for more 2 hours and the reaction was finished to give a reaction solution (solution of the aromatic oligoimine).

The viscosity of the obtained reaction solution and number-average degree of polymerization of the aromatic oligoimine contained in the reaction solution were examined in the same manner as in Example 1. The results are shown in Table 1.

Next, the above-mentioned reaction solution was casted on a glass plate and allowed to stand at 100° C. for one hour, then at 200° C. for 2 hours under reduced pressure (1 Torr) to give a redish orange film having a thickness of 0.028 mm.

The obtained film could be dissolved in a concentrated sulfuric acid. Therefore, 10 mg of the film was dissolved 0.5 ml of concentrated sulfuric acid-d2($D_2SO_4$) to which a little amount of tetramethylsilane was added to give a solution. Using the solution, $^1H$-NMR was measured in accordance with the same method for measuring $^1H$-NMR employed for examining the above-mentioned (B) Number-average degree of polymerization. The result is as follows:

$^1H$-NMR (δ (ppm): $D_2SO_4$) 8.7 (2H), 7.8 (2H), 7.3 (4H), 6.9 (4H), 2.1 (3H)

Also, the film was dissolved in 98% concentrated sulfuric acid to give a solution having a concentration of 0.2 g/100 $cm^3$. Using the solution, the intrinsic viscosity (η inh) of the aromatic polyimine was measured with an Ubbelohde's viscometer at 30° C. The result is shown in Table 2.

Moreover, using the obtained film, IR was measured in the same manner as in Example 1. As a result, the absorption was observed at 1620 $cm^{-1}$.

Also, using the obtained film, the tensile strength, elongation at break, Tg and initiative temperature of thermal decomposition were examined in the same manner as in Example 1. The results are shown in Table 2.

EXAMPLE 3

The same reaction solution (solution of the aromatic oligoimine) as that obtained in Example 2 was casted on a glass plate and allowed to stand at 100° C. for one hour, then at 150° C. for 6 hours under reduced pressure (1 Torr) to give a redish orange film having a thickness of 0.028 mm.

The obtained film could be dissolved in a concentrated surfuric acid. Therefore, using the film, $^1H$-NMR was measured in the same manner as in Example 2. The result is as follows:

$^1H$-NMR (δ (ppm): $D_2SO_4$) 8.7 (2H), 7.8 (2H), 7.3 (4H), 6.9 (4H), 2.1 (3H)

Also, using the film, the intrinsic viscosity (η inh) of the aromatic polyimine was measured in the same manner as in Example 2. The result is shown in Table 2.

Moreover, using the obtained film, IR was measured in the same manner as in Example 1. As a result, the absorption was observed at 1620 $cm^{-1}$.

Also, using the obtained film, the tensile strength, elongation at break, Tg and initiative temperature of thermal decomposition were examined in the same manner as in Example 1. The results are shown in Table 2.

EXAMPLE 4

The same reaction solution (solution of the aromatic oligoimine) as that obtained Example 2 was casted on a glass plate and allowed to stand at 100° C. for one hour, then at 230° C. for 4 hours under reduced pressure (1 Torr) to give a redish orange film having a thickness of 0.028 mm.

Although dissolving the obtained film in various organic solvents was tried, the film could not be completely dissolved in the organic solvents, so that the molecular weight of the obtained aromatic polyimine could not be determined.

Accordingly, the tensile strength and elongation at break were examined in the same manner as in Example 1. The results are shown in Table 2.

Also, using the obtained film, IR was measured in the same manner as in Example 1. As a result, the absorption was observed at 1620 $cm^{-1}$.

Moreover, using the obtained film, Tg and the initiative temperature of thermal decomposition were examined in the same manner as in Example 1. The results are shown in Table 2.

EXAMPLE 5

In Example 1, a reaction solution (solution of the aromatic oligoimine) was obtained from a reaction solution (concentration: 10.8% by weight) in the same manner as in Example 1 except that metacresol (hereinafter referred to as MC) was used instead of NMP.

The viscosity of the obtained reaction solution and number-average degree of polymerization of the aromatic oligoimine contained in the reaction solution were examined in the same manner as in Example 1. The results are shown in Table 1.

Next, using the above-mentioned reaction solution, a redish orange film having a thickness of 0.030 mm was obtained in the same manner as in Example 1.

Although dissolving the obtained film in various organic solvents was tried, the film could not be completely dissolved in the organic solvents, so that the molecular weight of the obtained aromatic polyimine could not be determined.

Accordingly, the tensile strength and elongation at break were examined in the same manner as in Example 1. The results are shown in Table 2.

Also, using the obtained film, IR was measured in the same manner as in Example 1. As a result, the absorption was observed at 1620 cm$^{-1}$.

Moreover, using the obtained film, Tg and the initiative temperature of thermal decomposition were examined in the same manner as in Example 1. The results are shown in Table 2.

EXAMPLE 6

Using the same reaction solution (solution of the aromatic oligoimine) as that obtained in Example 5, a redish orange film having a thickness of 0.028 mm was obtained in the same manner as in Example 2.

The obtained film could be dissolved in a concentrated surfuric acid. Therefore, using the film, $^1$H-NMR was measured in the same manner as in Example 2. The result is as follows:

$^1$H-NMR (δ (ppm): D$_2$SO$_4$) 8.7 (2H), 7.8 (2H), 7.3 (4H), 6.9 (4H), 2.1 (3H)

Also, using the film, the intrinsic viscosity (η inh) of the aromatic polyimine was measured in the same manner as in Example 2. The result is shown in Table 2.

Moreover, using the obtained film, IR was measured in the same manner as in Example 1. As a result, the absorption was observed at 1620 cm$^{-1}$.

Also, using the obtained film, the tensile strength, elongation at break, Tg and initiative temperature of thermal decomposition were examined in the same manner as in Example 1. The results are shown in Table 2.

EXAMPLE 7

In Example 1, a reaction solution (solution of the aromatic oligoimine) was obtained from a reaction solution (concentration: 10.4% by weight) in the same manner as in Example 1 except that 0.01 mole of 2,6-diformylphenol (hereinafter referred to as DFP) was used instead of DFMP.

The viscosity of the obtained reaction solution and number-average degree of polymerization of the aromatic oligoimine contained in the reaction solution were examined in the same manner as in Example 1. The results are shown in Table 1.

Next, using the above-mentioned reaction solution, a redish orange film having a thickness of 0.025 mm was obtained in the same manner as in Example 1.

Although dissolving the obtained film in various organic solvents are tried, the film could not be completely dissolved in the organic solvents, so that the molecular weight of the obtained aromatic polyimine could not be determined.

Accordingly, the tensile strength and elongation at break were examined in the same manner as in Example 1. The results are shown in Table 2.

Also, using the obtained film, IR was measured in the same manner as in Example 1. As a result, the absorption was observed at 1620 cm$^{-1}$.

Moreover, using the obtained film, Tg and the initiative temperature of thermal decomposition were examined in the same mariner as in Example 1. The results are shown in Table 2.

EXAMPLE 8

In Example 1, a reaction solution (solution of the aromatic oligoimine) was obtained from a reaction solution (concentration: 11.9% by weight) in the same manner as in Example 1 except that 0.01 mole of 2,6-diformyl-4-t-butylphenol (hereinafter referred to as DFBP) was used instead of DFMP.

The viscosity of the obtained reaction solution and number-average degree of polymerization of the aromatic oligoimine contained in the reaction solution were examined in the same manner as in Example 1. The results are shown in Table 1.

Next, using the above-mentioned reaction solution, a redish orange film having a thickness of 0.030 mm was obtained in the same manner as in Example 1.

Although dissolving the obtained film in various organic solvents was tried, the film could not be completely dissolved in the organic solvents, so that the molecular weight of the obtained aromatic polyimine could not be determined.

Accordingly, the tensile strength and elongation at break were examined in the same manner as in Example 1. The results are shown in Table 2.

Also, using the obtained film, IR was measured in the same manner as in Example 1. As a result, the absorption was observed at 1620 cm$^{-1}$.

Moreover, using the obtained film, Tg and the initiative temperature of thermal decomposition were examined in the same manner as in Example 1. The results are shown in Table 2.

EXAMPLE 9

Using the same reaction solution (solution of the aromatic oligoimine) as that obtained in Example 8, a redish orange film having a thickness of 0.030 mm was obtained in the same manner as in Example 2.

The obtained film could be dissolved in a concentrated surfuric acid. Therefore, using the film, the intrinsic viscosity (η inh) of the aromatic polyimine was measured in the same manner as in Example 2. The result is shown in Table 2.

Moreover, using the obtained film, IR was measured in the same manner as in Example 1. As a result, the absorption was observed at 1620 cm$^{-1}$.

Also, using the obtained film, the tensile strength, elongation at break, Tg and initiative temperature of thermal decomposition were examined in the same manner as in Example 1. The results are shown in Table 2.

EXAMPLE 10

In Example 1, a reaction solution (solution of the aromatic oligoimine) was obtained from a reaction solution (concentration: 10.8% by weight) in the same manner as in Example 1 except that 0.01 mole of 4,4'-diaminodiphenylmethane (hereinafter referred to as DADPM) was used instead of DADPE.

The viscosity of the obtained reaction solution and number-average degree of polymerization of the aromatic oligoimine contained in the reaction solution were examined in the same manner as in Example 1. The results are shown in Table 1.

Next, the above-mentioned reaction solution was casted on a glass plate and allowed to stand at 100° C. for one hour, then at 180° C. for 2 hours under reduced pressure (1 Torr) to give a redish orange film having a thickness of 0.028 mm.

The obtained film could be dissolved in a concentrated surfuric acid. Therefore, using the film, $^1$H-NMR was measured in the same manner as in Example 2. The result is as follows:

$^1$H-NMR (δ (ppm): $D_2SO_4$) 8.7 (2H), 7.8 (2H), 7.2 (4H), 7.0 (4H), 3.7 (2H), 2.1 (3H)

Also, using the film, the intrinsic viscosity (η inh) of the aromatic polyimine was measured in the same manner as in Example 2. The result is shown in Table 2.

Moreover, using the obtained film, IR was measured in the same manner as in Example 1. As a result, the absorption was observed at 1620 $cm^{-1}$.

Also, using the obtained film, the tensile strength, elongation at break, Tg and initiative temperature of thermal decomposition were examined in the same manner as in Example 1. The results are shown in Table 2.

EXAMPLE 11

In Example 1, a reaction solution (solution of the aromatic oligoimine) was obtained from a reaction solution (concentration: 16.3% by weight) in the same manner as in Example 1 except that 0.01 mole of 1,3-bis(4-aminophenoxy)benzene (hereinafter referred to as 3BAPB) was used instead of DADPE.

The viscosity of the obtained reaction solution and number-average degree of polymerization of the aromatic oligoimine contained in the reaction solution were examined in the same manner as in Example 1. The results are shown in Table 1.

Next, using the above-mentioned reaction solution, a redish orange film having a thickness of 0.031 mm was obtained in the same manner as in Example 1.

Although dissolving the obtained film in various organic solvents was tried, the film could not be completely dissolved in the organic solvents, so that the molecular weight of the obtained aromatic polyimine could not be determined.

Accordingly, the tensile strength and elongation at break were examined in the same manner as in Example 1. The results are shown in Table 2.

Also, using the obtained film, IR was measured in the same mariner as in Example 1. As a result, the absorption was observed at 1620 $cm^{-1}$.

Moreover, using the obtained film, Tg and the initiative temperature of thermal decomposition were examined in the same manner as in Example 1. The results are shown in Table 2.

EXAMPLE 12

In Example 10, a reaction solution (solution of the aromatic oligoimine) was obtained from a reaction solution (concentration: 16.3% by weight) in the same manner as in Example 10 except that 0.01 mole of 1,4-bis(4-aminophenoxy)benzene (hereinafter referred to as 4BAPB) was used instead of DADPM.

The viscosity of the obtained reaction solution and number-average degree of polymerization of the aromatic oligoimine contained in the reaction solution were examined in the same manner as in Example 1. The results are shown in Table 1.

Next, using the above-mentioned reaction solution, a redish orange film having a thickness of 0.035 mm was obtained in the same manner as in Example 10.

The obtained film could be dissolved in a concentrated surfuric acid. Therefore, using the film, $^1$H-NMR was measured in the same manner as in Example 2. The result is as follows:

$^1$H-NMR (δ (ppm): $D_2SO_4$) 8.7 (2H), 7.8 (2H), 6.8 to 7.4 (12H), 2.1 (3H)

Also, using the film, the intrinsic viscosity (η inh) of the aromatic polyimine was measured in the same manner as in Example 2. The result is shown in Table 2.

Moreover, using the obtained film, IR was measured in the same manner as in Example 1. As a result, the absorption was observed at 1620 $cm^{-1}$.

Also, using the obtained film, the tensile strength, elongation at break, Tg and initiative temperature of thermal decomposition were examined in the same manner as in Example 1. The results are shown in Table 2.

EXAMPLE 13

In Example 10, a reaction solution (solution of the aromatic oligoimine) was obtained from a reaction solution (concentration: 12.3% by weight) in the same manner as in Example 10 except that 0.01 mole of 3,3'-diaminodiphenyl sulfone (hereinafter referred to as DADPS) was used instead of DADPM.

The viscosity of the obtained reaction solution and number-average degree of polymerization of the aromatic oligoimine contained in the reaction solution were examined in the same maimer as in Example 1. The results are shown in Table 1.

Next, using the above-mentioned reaction solution, a redish orange film having a thickness of 0.035 mm was obtained in the same manner as in Example 10.

The obtained film could be dissolved in a concentrated surfuric acid. Therefore, using the film, $^1$H-NMR was measured in the same manner as in Example 2. The result is as follows:

$^1$H-NMR (δ (ppm): $D_2SO_4$) 8.9 (2H), 8.0 (2H), 7.9 (2H), 7.8 (2H), 7.6 (2H), 7.5 (2H), 2.0 (3H)

Also, using the film, the intrinsic viscosity (η inh) of the aromatic polyimine was measured in the same manner as in Example 2. The result is shown in Table 2.

Moreover, using the obtained film, IR was measured in the same manner as in Example 1. As a result, the absorption was observed at 1620 $cm^{-1}$.

Also, using the obtained film, the tensile strength, elongation at break, Tg and initiative temperature of thermal decomposition were examined in the same manner as in Example 1. The results are shown in Table 2.

EXAMPLE 14

In Example 1, a reaction solution (solution of the aromatic oligoimine) was obtained from a reaction solution (concentration: 11.6% by weight) in the same manner as in Example 1 except that 0.01 mole of 2,2-bis(4-aminophenyl)propane (hereinafter referred to as BAPP) was used instead of DADPE.

The viscosity of the obtained reaction solution and number-average degree of polymerization of the aromatic oligoimine contained in the reaction solution were examined in the same manner as in Example 1. The results are shown in Table 1.

Next, using the above-mentioned reaction solution, a redish orange film having a thickness of 0.033 mm was obtained in the same manner as in Example 1.

Although dissolving the obtained film in various organic solvents was tried, the film could not be completely dissolved in the organic solvents, so that the molecular weight of the obtained aromatic polyimine could not be determined.

Accordingly, the tensile strength and elongation at break were examined in the same manner as in Example 1. The results are shown in Table 2.

Also, using the obtained film, IR was measured in the same manner as in Example 1. As a result, the absorption was observed at 1620 cm$^{-1}$.

Moreover, by using the obtained film, Tg and the initiative temperature of thermal decomposition were examined in the same manner as in Example 1. The results are shown in Table 2.

EXAMPLE 15

In Example 10, a reaction solution (solution of the aromatic oligoimine) was obtained from a reaction solution (concentration: 15.1% by weight) in the same manner as in Example 10 except that 0.01 mole of 4,4'-bis(4-aminophenoxy)biphenyl (hereinafter referred to as BAPBP) was used instead of DADPM.

The viscosity of the obtained reaction solution and number-average degree of polymerization of the aromatic oligoimine contained in the reaction solution were examined in the same manner as in Example 1. The results are shown in Table 1.

Next, using the above-mentioned reaction solution, a redish orange film having a thickness of 0.034 mm was obtained in the same manner as in Example 10.

The obtained film could be dissolved in a concentrated surfuric acid. Therefore, using the film, the intrinsic viscosity (η inh) of the aromatic polyimine was measured in the same manner as in Example 2. The result is shown in Table 2.

Moreover, using the obtained film, IR was measured in the same manner as in Example 1. As a result, the absorption was observed at 1620 cm$^{-1}$.

Also, using the obtained film, the tensile strength, elongation at break, Tg and initiative temperature of thermal decomposition were examined in the same manner as in Example 1. The results are shown in Table 2.

EXAMPLE 16

The same reaction apparatus as that used in Example 1 was charged with 164 g (1 mole) of DFMP, 200 g (1 mole) of DADPE and 1000 ml of NMP, and the contents were stirred and dissolved with each other. After its dissolution, the reaction was immediately initiated at room temperature, and the reaction solution (concentration: 26.7% by weight) turned redish orange. The reaction solution was stirred at room temperature for more 2 hours and the reaction was finished to give a reaction solution (solution of the aromatic oligoimine).

The viscosity of the obtained reaction solution and number-average degree of polymerization of the aromatic oligoimine contained in the reaction solution were examined in the same manner as in Example 1. The results are shown in Table 1.

Next, the above-mentioned reaction solution was heated to 100° C. and discharged into a stream of nitrogen at 200° C. through a nozzle for spinning (hole diameter: 0.1 mm, number of hole: 50), and the discharged product was wound up at a rate of 100 m/minute to give yarn (fiber).

The obtained yarn could be dissolved in a concentrated sulfuric acid. Therefore, using 10 mg of the yarn instead of 10 mg of the film, $^1$H-NMR was measured in the same manner as in Example 2. The result is as follows:

$^1$H-NMR (δ (ppm): D$_2$SO$_4$) 8.7 (2H), 7.8 (2H), 7.3 (4H), 6.9 (4H), 2.1 (3H)

Also, using the yarn instead of the film, the intrinsic viscosity (η inh) of the aromatic polyimine was measured in the same manner as in Example 2. The result is shown in Table 2.

Moreover, using the obtained yarn, IR was measured in accordance with a diffuse reflection method by means of FTS-7 spectrometer commercially available from Nippon Bio-Rad Laboratories. As a result, the absorption was observed at 1620 cm$^{-1}$.

Also, using the yarn, Tg and the initiative temperature of thermal decomposition were examined in the same manner as in Example 1. The results are shown in Table 2.

Also, the mark ">300" described in the column of Tg of Table 2 means that Tg was not observed at highest 300° C.

Moreover, the components of the aromatic oligoimine and solvents are shown in Table 1 at the same time, and the treating condition during the formation of a film and the thickness of film are shown in Table 2 at the same time.

TABLE 1

| Example No. | Components of aromatic oligoimine (mole) | | Kind of solvent | Viscosity of solution of aromatic oligoimine (cSt) | Number-average degree of polymerization of aromatic oligoimine |
|---|---|---|---|---|---|
| | Aromatic dialdehyde | Aromatic diamine | | | |
| 1 | DFMP (0.01) | DADPE (0.01) | NMP | 36 | 7.5 |
| 2 | DFMP (0.1) | DADPE (0.1) | NMP | 380 | 7.5 |
| 3 | DFMP (0.1) | DADPE (0.1) | NMP | 380 | 7.5 |
| 4 | DFMP (0.1) | DADPE (0.1) | NMP | 380 | 7.5 |
| 5 | DFMP (0.01) | DADPE (0.01) | MC | 75 | 8.0 |
| 6 | DFMP (0.01) | DADPE (0.01) | MC | 75 | 8.0 |

TABLE 1-continued

| | Components of aromatic oligoimine (mole) | | | Viscosity of solution of aromatic oligoimine (cSt) | Number-average degree of polymerization of aromatic oligoimine |
|---|---|---|---|---|---|
| Example No. | Aromatic dialdehyde | Aromatic diamine | Kind of solvent | | |
| 7 | DFP (0.01) | DADPE (0.01) | NMP | 30 | 7.5 |
| 8 | DFBP (0.01) | DADPE (0.01) | NMP | 47 | 9.0 |
| 9 | DFBP (0.01) | DADPE (0.01) | NMP | 47 | 9.0 |
| 10 | DFMP (0.01) | DADPM (0.01) | NMP | 16.3 | 9.8 |
| 11 | DFMP (0.01) | 3BAPB (0.01) | NMP | 24 | 8.5 |
| 12 | DFMP (0.01) | 4BAPB (0.01) | NMP | 45.5 | 9.5 |
| 13 | DFMP (0.01) | DADPS (0.01) | NMP | 7.8 | 5.2 |
| 14 | DFMP (0.01) | BAPP (0.01) | NMP | 18 | 10.2 |
| 15 | DFMP (0.01) | BAPBP (0.01) | NMP | 50.5 | 9.2 |
| 16 | DFMP (1) | DADPE (1) | NMP | 175 | 7.5 |

TABLE 2

| | Treating condition during formation of film | | Physical property of aromatic polyimine | | | | | |
|---|---|---|---|---|---|---|---|---|
| Example No. | Temperature (°C.) | Period of time (hours) | Thickness of film (mm) | Intrinsic viscosity ($\eta$ inh) | Tensile strength (kgf/cm$^2$) | Elongation at break (%) | Tg (°C.) | Initiative temperature of thermal decomposition (°C.) |
| 1 | 200 | 4 | 0.028 | — | 552 | 1.8 | >300 | 400 |
| 2 | 200 | 2 | 0.028 | 0.70 | 1100 | 33.0 | >300 | 400 |
| 3 | 150 | 6 | 0.028 | 1.58 | 820 | 25.0 | >300 | 400 |
| 4 | 230 | 4 | 0.028 | — | 1720 | 23.0 | >300 | 410 |
| 5 | 200 | 4 | 0.030 | — | 448 | 2.0 | >300 | 400 |
| 6 | 200 | 2 | 0.028 | 1.30 | 750 | 30.0 | >300 | 390 |
| 7 | 200 | 4 | 0.025 | — | 521 | 1.6 | >300 | 410 |
| 8 | 200 | 4 | 0.030 | — | 398 | 1.5 | >300 | 330 |
| 9 | 200 | 2 | 0.030 | 0.63 | 450 | 1.5 | >300 | 330 |
| 10 | 180 | 2 | 0.028 | 1.04 | 1050 | 23.0 | >300 | 410 |
| 11 | 200 | 4 | 0.031 | — | 532 | 2.0 | >300 | 390 |
| 12 | 180 | 2 | 0.035 | 2.42 | 1550 | 35.0 | >300 | 390 |
| 13 | 180 | 2 | 0.035 | 0.60 | 350 | 7.0 | >300 | 370 |
| 14 | 200 | 4 | 0.033 | — | 488 | 1.8 | >300 | 325 |
| 15 | 180 | 2 | 0.034 | 2.60 | 1330 | 26.0 | >300 | 415 |
| 16 | — | — | — | 2.03 | — | — | >300 | 400 |

As shown in Table 1, the aromatic oligoimines of the present invention, which were obtained in Examples 1 to 16 had a number-average degree of polymerization of about 5 to about 11. Also, as shown in Table 2, the aromatic polyimines obtained from the aromatic oligoimines had a tensile strength of about 350 to about 1800 kgf/cm$^2$ and an elongation at break of 1.5 to 35.0%, and their intrinsic viscosity was about 0.6 to about 2.6.

Industrial Applicability

In accordance with the process for preparing an aromatic oligoimine of the present invention, an aromatic oligoimine can be easily prepared, and the obtained aromatic oligoimine of the present invention can be suitably used for materials such as a matrix resin for a composite material, an insulating material and a heat-resistant adhesive.

Also, in accordance with the process for preparing an aromatic polyimine of the present invention, an aromatic polyimine can be easily prepared from the above-mentioned aromatic oligoimine. Moreover, the obtained aromatic polyimine of the present invention can be easily formed into a film or a fiber and besides, the aromatic polyimine is excellent in heat resistance. Therefore, the aromatic polyimine can be suitably used for various polymeric materials for industry.

I claim:

1. An aromatic oligoimine composed of a reaction product of an aromatic dialdehyde having a phenolic hydroxyl group, represented by the general formula (I):

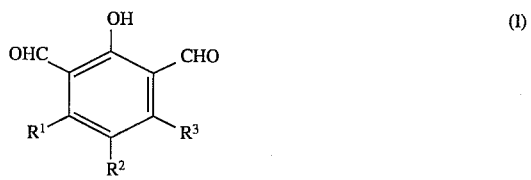

(I)

wherein each of R$^1$, R$^2$ and R$^3$ is independently a hydrogen atom, an alkyl group or an aryl group, the total number of carbon atoms contained in R$^1$, R$^2$ and R$^3$ is at most 10, and an aromatic diamine represented by the general formula (II):

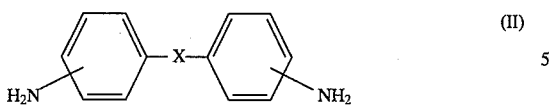

wherein X is a single bond, a linear or branched alkylene group having at most 6 carbon atoms, an arylene group, oxygen atom, sulphur atom, —$SO_2$—, a group represented by the general formula: —$Y^1$—Ar—$Y^1$— in which Ar is phenylene group, $Y^1$ is a single bond, a linear or branched alkylene group having at most 6 carbon atoms, an arylene group, oxygen atom, sulphur atom or —$SO_2$—, or a group represented by the general formula: —$Y^1$—Ar—$Y^1$—Ar—$Y^1$— in which Ar and $Y^1$ are the same as defined above, having a recurring unit represented by the general formula (III):

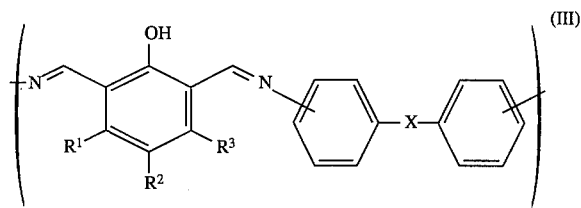

wherein $R^1$, $R^2$, $R^3$ and X are the same as defined above and a degree of polymerization of 2 to 20.

2. The aromatic oligoimine of claim 1, wherein said aromatic diamine is an aromatic diamine having 2 to 4 benzene rings.

3. A process for preparing an aromatic oligoimine having a recurring unit represented by the general formula (III):

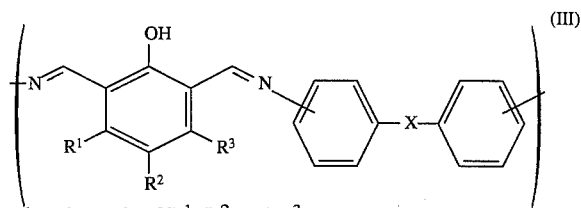

wherein each of $R^1$, $R^2$ and $R^3$ is independently a hydrogen atom, an alkyl group or an aryl group, the total number of carbon atoms contained in $R^1$, $R^2$ and $R^3$ is at most 10, and X is a single bond, a linear or branched alkylene group having at most 6 carbon atoms, an arylene group, oxygen atom, sulphur atom, —$SO_2$—, a group represented by the general formula: —$Y^1$—Ar—$Y^1$— in which Ar is phenylene group, $Y^1$ is a single bond, a linear or branched alkylene group having at most 6 carbon atoms, an arylene group, oxygen atom, sulphur atom or —$SO_2$—, or a group represented by the general formula: —$Y^1$—Ar—$Y^1$—Ar—$Y^1$— in which Ar and $Y^1$ are the same as defined above, and a degree of polymerization of 2 to 20, which comprises conducting the condensation of an aromatic dialdehyde having a phenolic hydroxyl group, represented by the general formula (I):

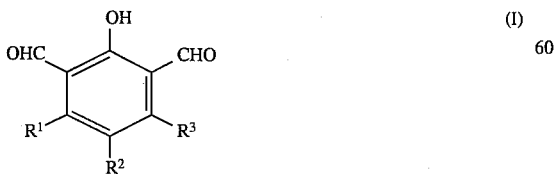

wherein $R^1$, $R^2$ and $R^3$ are the same as defined above and an aromatic diamine represented by the general formula (II):

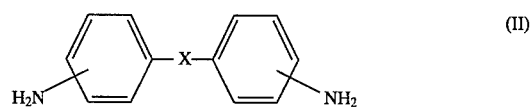

wherein X is the same as defined above in the presence of at least one solvent selected from an amido solvent or a phenolic solvent.

4. An aromatic polyimine having a recurring unit represented by the general formula (III):

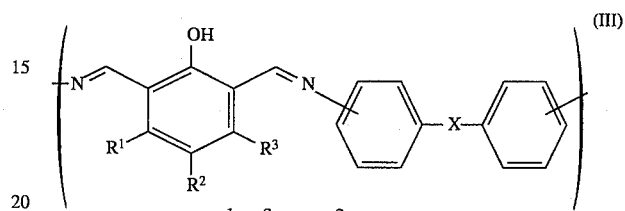

wherein each of $R^1$, $R^2$ and $R^3$ is independently a hydrogen atom, an alkyl group or an aryl group, the total number of carbon atoms contained in $R^1$, $R^2$ and $R^3$ is at most 10, and X is a single bond, a linear or branched alkylene group having at most 6 carbon atoms, an arylene group, oxygen atom, sulphur atom, —$SO_2$—, a group represented by the general formula: —$Y^1$—Ar—$Y^1$— in which Ar is phenylene group, $Y^1$ is a single bond, a linear or branched alkylene group having at most 6 carbon atoms, an arylene group, oxygen atom, sulphur atom or —$SO_2$—, or a group represented by the general formula: —$Y^1$—Ar—$Y^1$—Ar—$Y^1$— in which Ar and $Y^1$ are the same as defined above, made by thermally dehydrating an aromatic oligoimine having a recurring unit represented by the general formula (III):

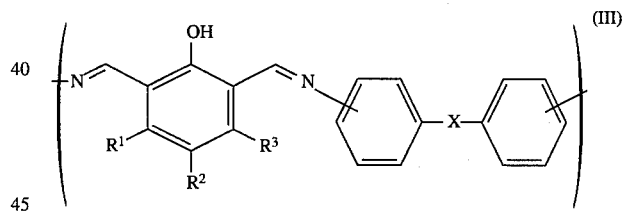

wherein $R^1$, $R^2$, $R^3$ and X are the same as defined above and a degree of polymerization of 2 to 20, composed of a reaction product of an aromatic dialdehyde having a phenolic hydroxyl group, represented by the general formula (I):

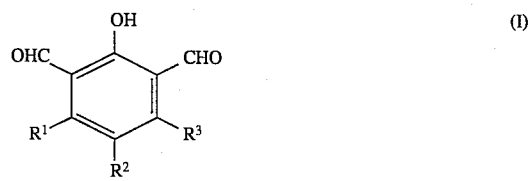

wherein $R^1$, $R^2$ and $R^3$ are the same as defined above and an aromatic diamine represented by the general formula (II):

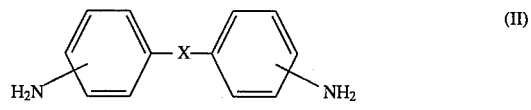

wherein X is the same as defined above.

5. A process for preparing an aromatic polyimine having a recurring unit represented by the general formula (III):

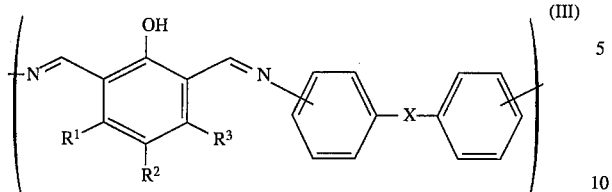

wherein each of $R^1$, $R^2$ and $R^3$ is independently a hydrogen atom, an alkyl group or an aryl group, the total number of carbon atoms contained in $R^1$, $R^2$ and $R^3$ is at most 10, and X is a single bond, a linear or branched alkylene group having at most 6 carbon atoms, an arylene group, oxygen atom, sulphur atom, —$SO_2$—, a group represented by the general formula: —$Y^1$—Ar—$Y^1$— in which Ar is phenylene group, $Y^1$ is a single bond, a linear or branched alkylene group having at most 6 carbon atoms, an arylene group, oxygen atom, sulphur atom or —$SO_2$—, or a group represented by the general formula: —$Y^1$—Ar—$Y^1$—Ar—$Y^1$— in which Ar and $Y^1$ are the same as defined above, which comprises preparing an aromatic oligoimine having a recurring unit represented by the general formula (III):

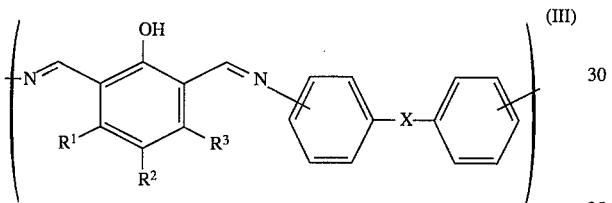

wherein $R^1$, $R^2$, $R^3$ and X are the same as defined above and a degree of polymerization of 2 to 20 by reacting an aromatic dialdehyde having a phenolic hydroxyl group, represented by the general formula (I):

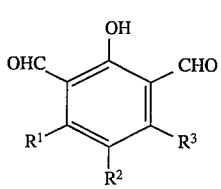

wherein $R^1$, $R^2$ and $R^3$ are the same as defined above with an aromatic diamine represented by the general formula (II):

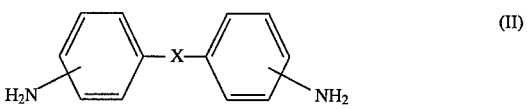

wherein X is the same as defined above, and thermally dehydrating said aromatic oligoimine.

6. The process of claim 5, wherein said aromatic oligoimine is prepared in the presence of at least one solvent selected from the group consisting of an amido solvent and a phenolic solvent.

7. The process of claim 5, wherein said aromatic oligoimine is formed into a film before said thermal dehydration thereof.

8. The process of claim 5, wherein said aromatic oligoimine is formed into a fiber before said thermal dehydration thereof.

9. The aromatic polyimine of claim 4, wherein the intrinsic viscosity of 0.2 g/100 cm$^3$ concentrated sulfuric acid solution of said aromatic polyimine is 0.2 to 4 at 30° C.

10. The aromatic polyimine of claim 4, which has a tensile strength of 100 to 5000 kgf/cm$^2$ and an elongation at break of 0.5 to 100%.

* * * * *